Oct. 26, 1937.   J. L. HULBERT   2,096,807
SPEED CONTROLLER FOR MILKING MACHINES
Filed May 4, 1936
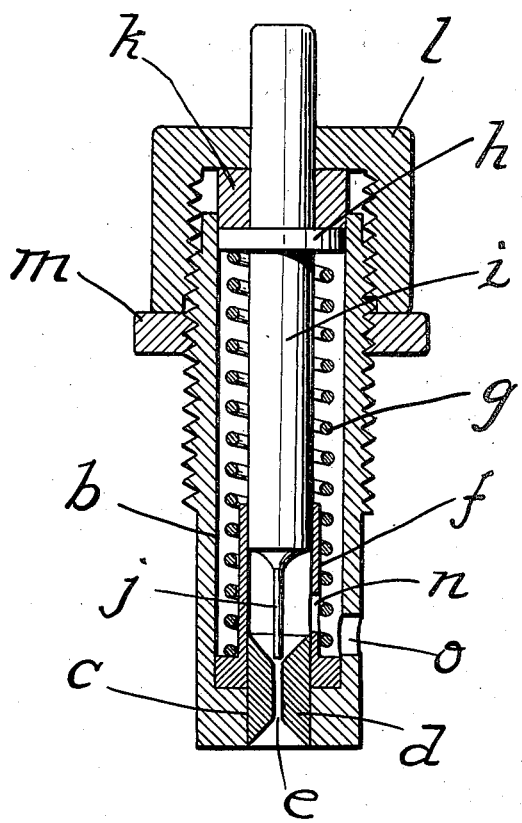
WITNESS:
INVENTOR
John L. Hulbert
BY
Busser Harding
ATTORNEYS.

Patented Oct. 26, 1937

2,096,807

UNITED STATES PATENT OFFICE 2,096,807

SPEED CONTROLLER FOR MILKING MACHINES

John L. Hulbert, Poughkeepsie, N. Y., assignor to The De Laval Separator Company, New York, N. Y., a corporation of New Jersey Application May 4, 1936, Serial No. 77,775

2 Claims. (Cl. 138—44)

My invention relates to pneumatically operated milking machine pulsators and particularly to devices for controlling the rate of flow of air to the pulsator to control the speed of the pulsator.

The object of my invention is to provide a speed control device that will have little tendency to clog with dirt, that when it does clog may be easily cleaned, and that may be adjusted to cause any desired speed.

In an application filed by me April 20, 1935, Serial No. 17,385, I illustrate but do not claim a cleanable nonadjustable speed control for a milking machine pulsator. This control, however, is not a full or accurate disclosure of the device with which the commercial pulsator is equipped and which embodies my invention. The device embodying my invention is shown in the accompanying drawing, which is a longitudinal sectional view of a preferred embodiment of the invention.

I am aware that it is old to provide a flat-ended bushing provided with a central hole through which flows air to the pulsator and to provide a needle valve that is adjustable to control such flow and which may be pressed through the passage for the intended purpose of cleaning the passage, but the square-ended opening at the mouth of the passage, because of the vena contracta, has quick collection of dirt therein and consequently quick reduction of speed. When a tapered wire is forced through a small passage it has a tendency to pack dirt against the sides causing a rough surface to which more dirt will adhere than to a smooth clean hole.

My improved speed regulator overcomes the objections specified and has other advantageous features of construction.

$a$ is a cylindrical body which throughout most of its length is of relatively large diameter $b$ and is of reduced diameter at one end. A bushing $d$, having a small axial passage $e$ with both ends bell mouthed or stream lined, is forced into the small diameter $c$. A tube $f$ fits around the upper end of the bushing and guides the lower end of a spring $g$ having its upper end abutting against a collar $h$ on a plunger $i$. The lower end of the plunger is guided in the tube $f$ and carries a wire or pin $j$ in line with the passage $e$. The upper end of the plunger $i$ is guided by a bushing $k$, fitting the large diameter $b$, against which presses an inturned flange on a nut $l$ fitting the threaded exterior of the body. A lock nut $m$ is provided to be forced against the nut $l$ to prevent accidental movement. Holes $n$ and $o$ provide for air flow through the tube $f$ and body $a$.

In operation the flow of air to and from the pulsator (not shown) is controlled by the passage $e$, which is made large enough to permit a slightly higher speed than is desired. The nut $l$ may be turned to force the plunger $i$ and wire $j$, against the tension of the spring $g$, into such close proximity to the entrance to the passage $e$ that the flow is controlled at the desired rate. Tightening the lock nut $m$ retains the adjustment when set.

Because of the stream-lined form of both ends of the passage $e$, collection of dirt in the passage will be very slow, but it will eventually collect and cause slowing of the operation. Pressure of a finger on the outer end of the plunger $i$ will force it inward and push the wire $j$ through the passage, shearing off and forcing out all dirt. When the finger is removed the spring will return the plunger and wire to the normal position and the device will operate at normal speed.

What I claim and desire to protect by Letters Patent is:

1. A device for controlling flow of air in pneumatically operated milking machine pulsators and thereby controlling the speed of the pulsator, comprising a member provided with a passage having a bell-mouthed entrance, a flat-ended throttling pin aligning with and of approximately the diameter of the part of the passage beyond its bell-mouthed entrance and movable in the direction of its length to move the flat end of the pin through the passage and clean it; and means to adjust the pin to hold it to position its flat end within said bell-shaped mouth in throttling relation with said passage.

2. A device for controlling flow of air in pneumatically operated milking machine pulsators and thereby controlling the speed of the pulsator, comprising a member provided with a passage of restricted diameter and therefore having a tendency to be obstructed by dirt and having a bell-mouthed entrance, a plunger and a pin carried thereby aligning with and of approximately the diameter of the passage, said pin having a flat end, resilient means normally retracting the plunger and pin, means limiting the retracting movement of the pin to position the flat end thereof within said bell-shaped mouth in throttling relation with the restricted passage, the plunger being manually movable against the action of the spring to force the pin through the restricted passage and by action of its flat end shear dirt off the wall of the passage and push it out.

JOHN L. HULBERT.